(12) United States Patent
Cho

(10) Patent No.: US 11,427,158 B2
(45) Date of Patent: Aug. 30, 2022

(54) METHOD AND DEVICE FOR SMART CONTROL OF VEHICLE WHILE DEFENDING AGAINST RSA BY USING MOBILE DEVICE

(71) Applicant: Wonki Cho, Guri-si Gyeonggi-do (KR)

(72) Inventor: Wonki Cho, Guri-si Gyeonggi-do (KR)

(73) Assignee: ONEKEY INC., Seoul (KR)

(*) Notice: Subject to any disclaimer, the term of this patent is extended or adjusted under 35 U.S.C. 154(b) by 304 days.

(21) Appl. No.: 16/754,249

(22) PCT Filed: Oct. 11, 2017

(86) PCT No.: PCT/KR2017/011201
§ 371 (c)(1),
(2) Date: Apr. 7, 2020

(87) PCT Pub. No.: WO2019/074135
PCT Pub. Date: Apr. 18, 2019

(65) Prior Publication Data
US 2020/0276959 A1     Sep. 3, 2020

(51) Int. Cl.
| | |
|---|---|
| *B60R 25/24* | (2013.01) |
| *B60R 25/01* | (2013.01) |
| *B60R 25/04* | (2013.01) |
| *H04W 4/021* | (2018.01) |
| *H04W 4/80* | (2018.01) |
| *H04W 84/12* | (2009.01) |

(52) U.S. Cl.
CPC ............ *B60R 25/245* (2013.01); *B60R 25/01* (2013.01); *B60R 25/04* (2013.01); *H04W 4/021* (2013.01); *B60R 2325/101* (2013.01); *B60R 2325/106* (2013.01); *B60R 2325/205* (2013.01); *H04W 4/80* (2018.02); *H04W 84/12* (2013.01)

(58) Field of Classification Search
None
See application file for complete search history.

(56) References Cited

U.S. PATENT DOCUMENTS

| | | |
|---|---|---|
| 2012/0092129 A1 | 4/2012 | Lickfelt |
| 2016/0266235 A1* | 9/2016 | Hannon ............ H04M 1/72457 |

(Continued)

FOREIGN PATENT DOCUMENTS

| | | |
|---|---|---|
| JP | 2013-104247 A | 5/2013 |
| JP | 2017-505918 A | 2/2017 |

(Continued)

*Primary Examiner* — Carlos Garcia
(74) *Attorney, Agent, or Firm* — Novick, Kim & Lee, PLLC; Jae Youn Kim

(57) ABSTRACT

Provided are a method and a device for smart control of a vehicle while defending against an RSA by using a mobile device. The method includes the steps of: establishing a communication network to be able to transmit/receive information to/from a mobile device of a driver through Bluetooth or Wi-Fi; and determining, when an RSS value of a Bluetooth or Wi-Fi signal received from the mobile device of the driver is measured to be equal to or larger than a predetermined reference value, that the position of the mobile device of the driver is within a predetermined primary range (25 m) and transmitting a sound wave of 2 to 24000 Hz that can be recognized through three or more speakers mounted in the vehicle.

5 Claims, 7 Drawing Sheets

(56) References Cited

U.S. PATENT DOCUMENTS

| | | | |
|---|---|---|---|
| 2016/0272154 A1 | 9/2016 | Sanji et al. | |
| 2020/0103486 A1* | 4/2020 | Knaappila | H04R 3/12 |
| 2020/0276959 A1* | 9/2020 | Cho | B60R 25/04 |

FOREIGN PATENT DOCUMENTS

| | | |
|---|---|---|
| KR | 10-2014-0036564 A | 3/2014 |
| KR | 10-2014-0052099 A | 5/2014 |
| KR | 10-1667990 B1 | 10/2016 |
| WO | 2015-070064 A1 | 5/2015 |

* cited by examiner

METHOD AND DEVICE FOR SMART CONTROL OF VEHICLE WHILE DEFENDING AGAINST RSA BY USING MOBILE DEVICE

TECHNICAL FIELD

The present invention relates to a technique for determining a location of a driver or a mobile device possessed by the driver using a Bluetooth signal and acoustic waves, defending against a relay station attack (RSA), and controlling any function, such as opening or closing of a door or trunk of a vehicle, starting of the vehicle, or the like.

BACKGROUND ART

Mobile devices such as smartphones are being commonly used in modern society, and people use one mobile device to listen to music, surf the Internet, pay using cards, and use public transportation, without any other devices.

By utilizing such a mobile device, it is possible to determine a location of a driver, open or close a door and trunk of a vehicle, and control starting of the vehicle without using an existing car key, thereby providing a high level of convenience to the driver.

Referring to FIGS. 1 and 2, in US Unexamined Patent Application Publication No. 20120092129A1 of Honda Motor Co., Ltd., a method is disclosed in which in an existing smart key system, a key fob and a vehicle transmit and receive radio signals generated thereby to and from each other to determine a location of the key fob on the basis of a received signal strength value.

Referring to FIG. 3, in Unexamined Patent Application Publication No. WO2015070064 of Driving Management Systems, Inc., a technique for tracking a location of an electric device using acoustic waves is disclosed. Such a technique includes connecting a mobile device to a hardware component independent of the mobile device using wireless technology standards for exchanging data, such as Bluetooth or the like, determining whether the mobile device is pairing with the hardware component, transmitting, by an output device inside a vehicle, an acoustic wave signal or a ultrasonic wave signal, and determining, by the mobile device which receives the acoustic wave signal or the ultrasonic wave signal, whether a driver is located in a driver area of the vehicle.

Further, according to Korean Laid-open Patent Publication No. 10-13814531 of Inha University Industry-Academic Cooperation Foundation, when a difference between a radio signal reception time and a beep reception time is less than or equal to a preset value, a transmission and reception system which receives a response of a vehicle is established to open or close a door of the vehicle with a radio signal, and a beep is used as a means for verifying the opening or closing of the vehicle.

Furthermore, in the present invention, by utilizing radio signals and voice signals, it is possible to prevent vehicle theft and remote hacking by defending against a relay station attack (RSA), which is a security problem of smart key systems of the existing vehicles, such as remote keys, thereby addressing the existing security problems such as vehicle theft and hacking.

DOCUMENT OF RELATED ART

Patent Document

US Unexamined Patent Application Publication No. 2012-0092129 A1 (published on Apr. 19, 2012)

Unexamined Patent Application Publication No. WO2015070064 (published on May 14, 2015)

Korean Laid-open Patent Publication No. 10-1381453B1 (published on Apr. 4, 2014).

DISCLOSURE

Technical Problem

The present invention is directed to providing a smart key function that is secure against a relay station attack (RSA) by using a mobile device.

Technical Solution

According to an aspect of the present invention, there is provided a method for smart control of a vehicle while defending against a relay station attack (RSA) by using a mobile device, which includes establishing a communication network to transmit and receive information with a mobile device of a driver via Bluetooth or Wi-Fi communication, when a received signal strength (RSS) value of a Bluetooth or Wi-Fi signal received from the mobile device of the driver is measured to be a predetermined reference value or more, determining that a location of the mobile device of the driver is within a first predetermined range and transmitting recognizable acoustic waves having a frequency of 2 to 24,000 Hz through three or more speakers mounted in the vehicle, calculating a time of arrival of the acoustic waves transmitted from the speakers to the mobile device of the driver and determining a three-dimensional (3D) location of the mobile device of the driver, when the 3D location of the mobile device of the driver approaches within a second predetermined range, receiving an opening or closing command of a door or trunk from the mobile device of the driver, and after performing the command including the opening or closing command of the door or trunk, when it is determined that the mobile device of the driver is located in a predetermined zone in the vehicle, controlling starting of the vehicle.

Advantageous Effects

According to the present invention, by replacing a method of transmitting a radio signal of a low frequency (LF) of an existing smart key of a vehicle with a method of transmitting an acoustic wave signal, the same function can be implemented using only a mobile device without the existing smart key of the vehicle and an RSA can be defended.

According to the present invention, a smart key function that is secure against an RSA can be implemented, and by applying the above smart key function, a temporary key that can be temporarily used can be delegated to another user who performs valet parking so that the vehicle can be temporarily controlled.

According to the present invention, the temporary key that can be temporarily used can be delegated to be used only for opening a trunk so that when an authorized delivery man approaches the vehicle, only the trunk can be opened to place objects in the trunk.

According to the present invention, it is possible to apply to car sharing so that a plurality of authenticated users (e.g., a specific group driving a family vehicle or a corporate vehicle) share access rights to the vehicle and share the vehicle.

According to the present invention, by applying the same function to a door lock system, it is possible to implement a function of opening the door lock without additional input when a user with an authenticated mobile device approaches within a certain distance.

MODES OF THE INVENTION

Figure 1:
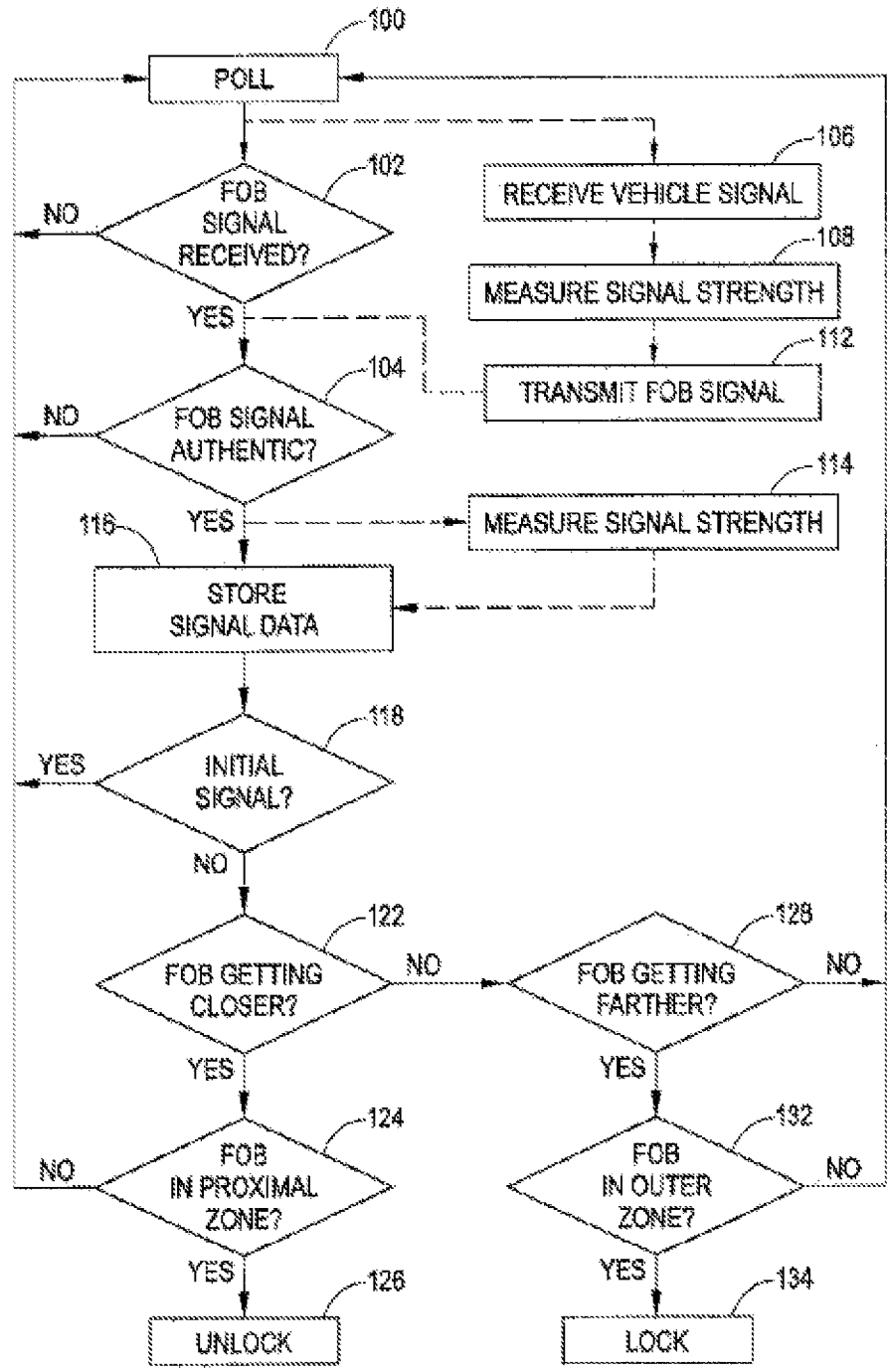
FIGS. 1 and 2 are diagrams illustrating the case of recognizing a location of a key fob or a case of opening or closing a door of a vehicle in an existing smart key system.
Figure 2:
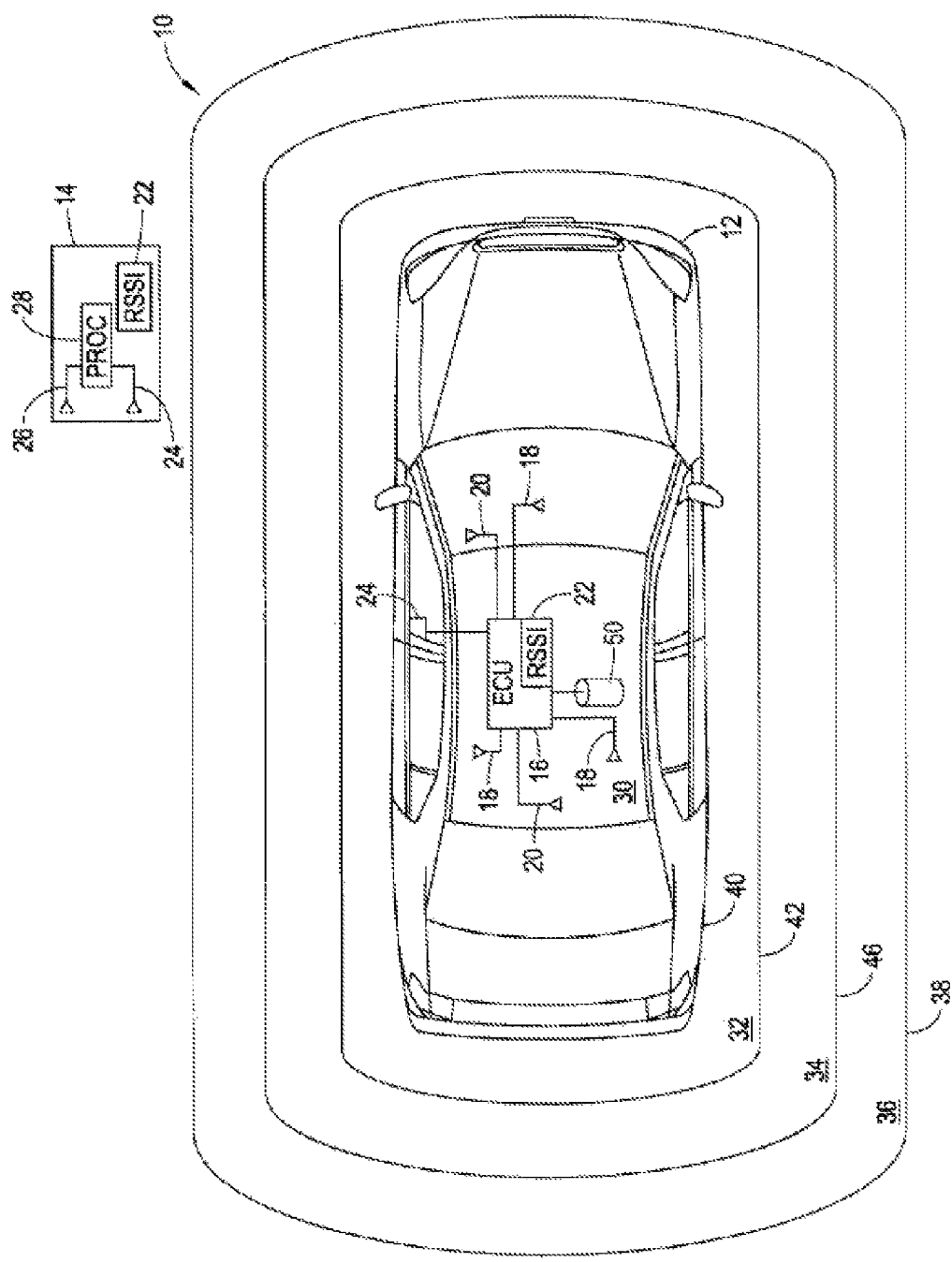
Figure 3:
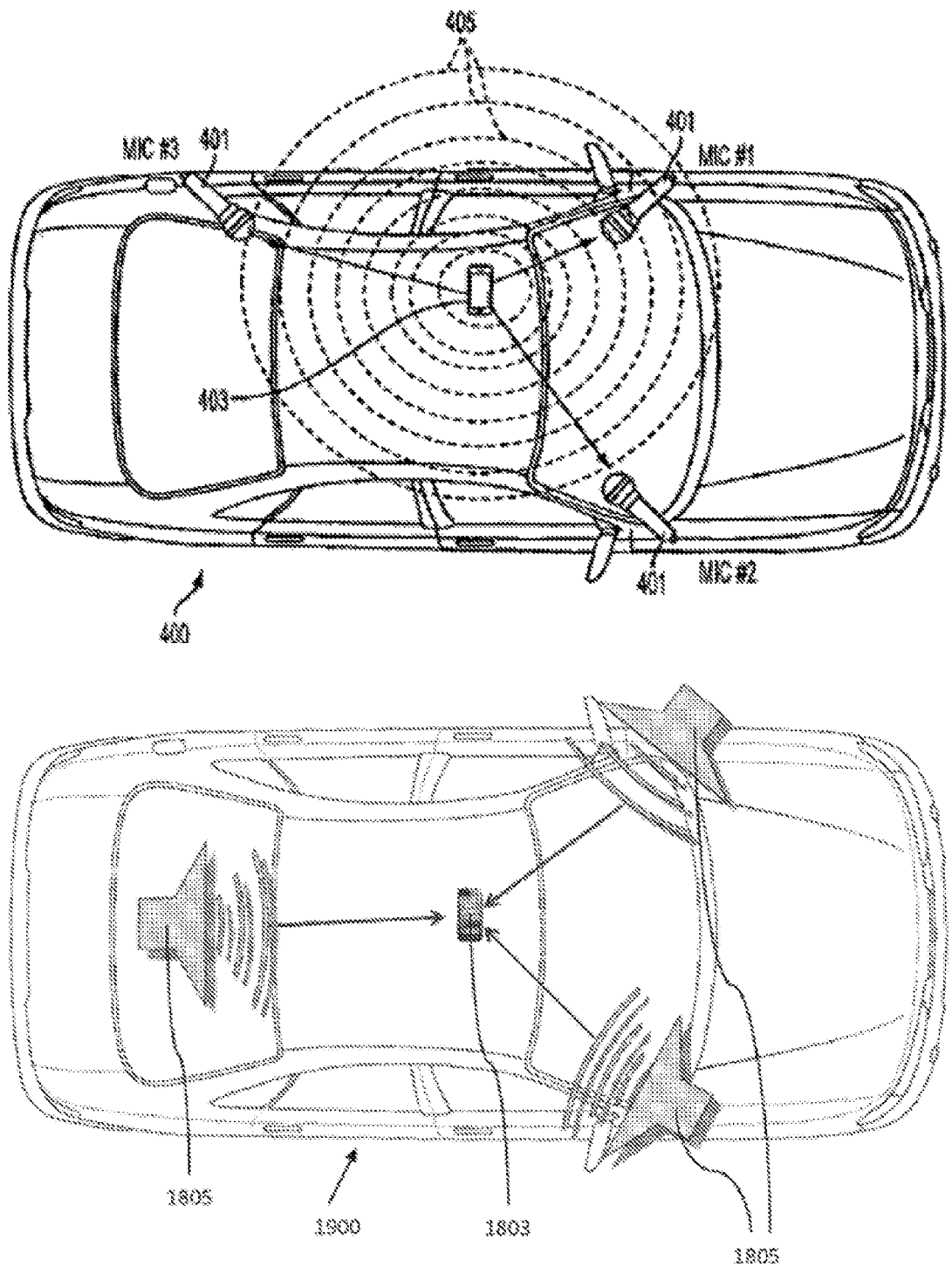
FIG. 3 is a diagram for describing an existing technique for determining a location of a mobile device using acoustic waves inside a vehicle.

According to an aspect of the present invention, there is provided a method for smart control of a vehicle while defending against a relay station attack (RSA) by using a mobile device, which includes establishing a communication network to transmit and receive information with a mobile device of a driver via Bluetooth or Wi-Fi communication, when a received signal strength (RSS) value of a Bluetooth or Wi-Fi signal received from the mobile device of the driver is measured to be a predetermined reference value or more, determining that a location of the mobile device of the driver is within a first predetermined range and transmitting recognizable acoustic waves having a frequency of 2 to 24,000 Hz through three or more speakers mounted in the vehicle, calculating a time of arrival of the acoustic waves transmitted from the speakers to the mobile device of the driver and determining a three-dimensional (3D) location of the mobile device of the driver, when the 3D location of the mobile device of the driver approaches within a second predetermined range, receiving any command including an opening or closing command of a door or trunk from the mobile device of the driver, and after performing the command including the opening or closing command of the door or trunk, when it is determined that the mobile device of the driver is located in a predetermined zone in the vehicle, controlling starting of the vehicle.

Hereinafter, embodiments of the present invention that are easily performed by those skilled in the art will be described in detail with reference to the accompanying drawings. However, the present invention may be implemented in several different forms and are not limited to the embodiments described herein. In addition, parts irrelevant to description are omitted in the drawings in order to clearly explain the present invention. The same or similar parts are denoted by the same or similar reference numerals throughout this specification.

Objects and effects of the present invention may be naturally understood or may become more apparent from the following description and the objects and effects of the present invention are not limited only by the following description.

The objects, features, and advantages of the present invention will become more apparent from the following detailed description. When the embodiments of the present invention are described, if it is determined that detailed descriptions of known technology related to the present invention unnecessarily obscure the subject matter of the invention, detailed descriptions thereof will be omitted. Hereinafter, the embodiments of the present invention will be described in detail with reference to the accompanying drawings.

Figure 4:
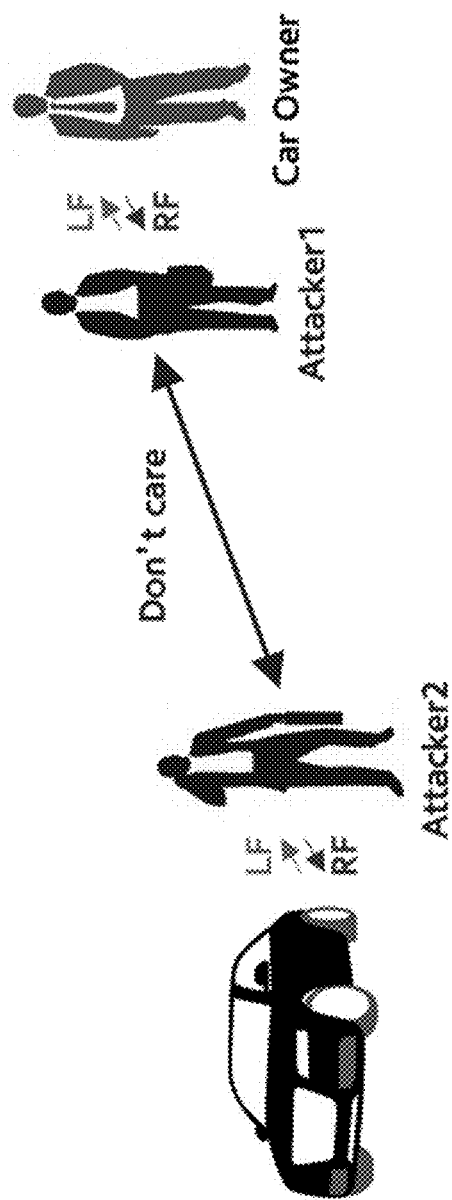
FIG. 4 is a diagram for describing a principle of a relay station attack (RSA).

FIG. 4 is a diagram for describing a principle of a relay station attack (RSA) to be defended in the present invention.

Referring to FIG. 4, a passive smart key that unlocks only by holding a door handle of a vehicle while the smart key is in a bag or pocket may open or close a door of the vehicle or start the vehicle even without inserting the key in a keyhole. Such passive smart keys are commonly being used.

When an attacker 2 amplifies a signal having a frequency, which is transmitted from a passive smart key and used by a vehicle, using an amplifier while maintaining a distance of about 5 to 7 meters from a driver who owns the passive smart key, an attacker 1, who is waiting near the vehicle, may transmit the amplified signal to the vehicle to unlock a security device or a locking device and get in the vehicle to start the vehicle.

In this case, since the signal transmitted by the attacker 1 to the vehicle is a signal including a valid command directly generated by the smart key of the driver, it is possible for a third person to unlock the vehicle through an RSA even when the vehicle and the driver are far away from each other. Specifically, the amplifier used by the attacker 2 may be small enough to be held in hand and may amplify the signal of the smart key to transmit up to 30 meters away. In this case, even when a distance between the driver and the vehicle is 100 meters or more, the door of the vehicle may be opened and the vehicle may start.

Figure 5:
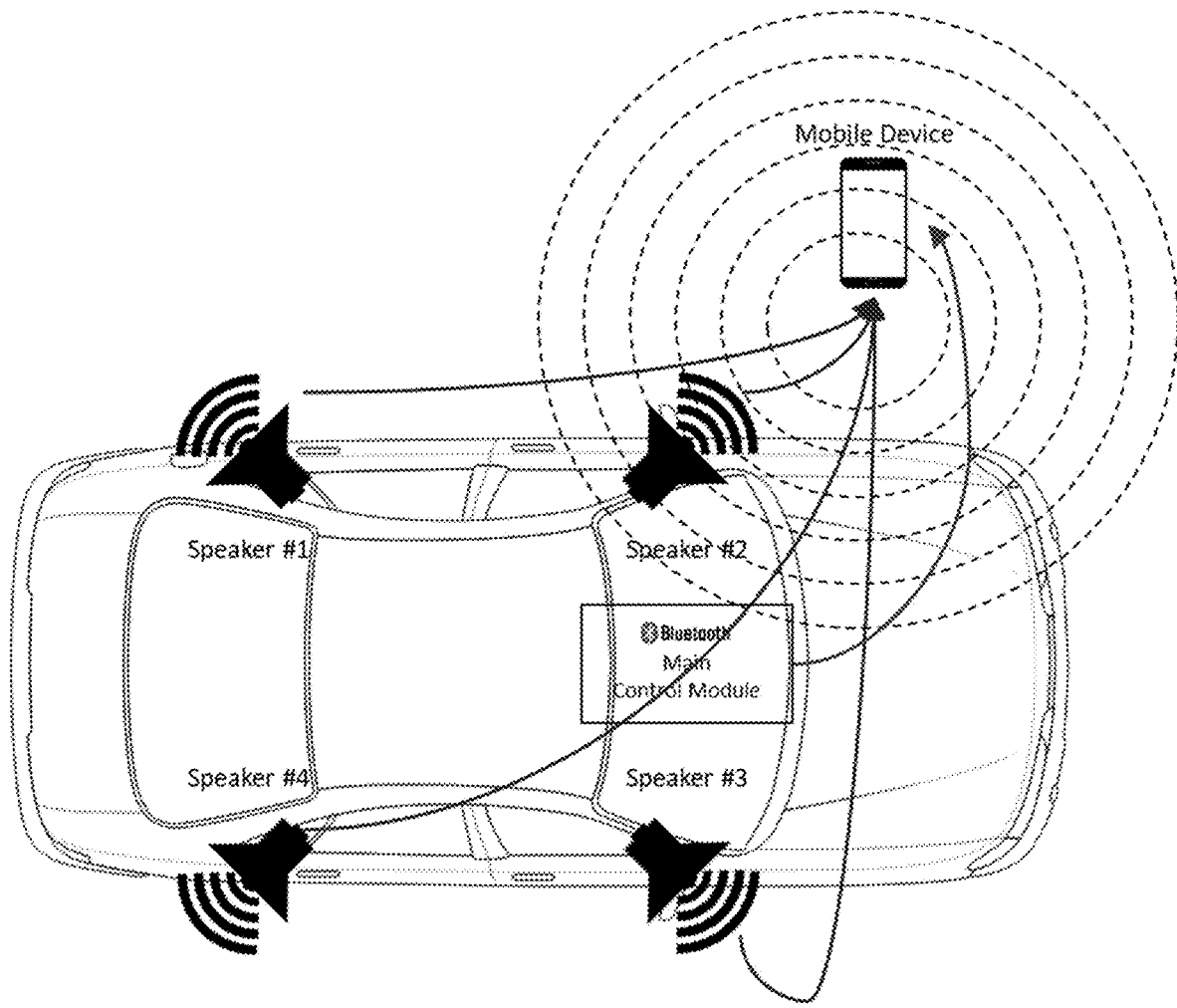
FIG. 5 is a diagram illustrating a configuration of a location recognition system according to the present invention.
Figure 6:
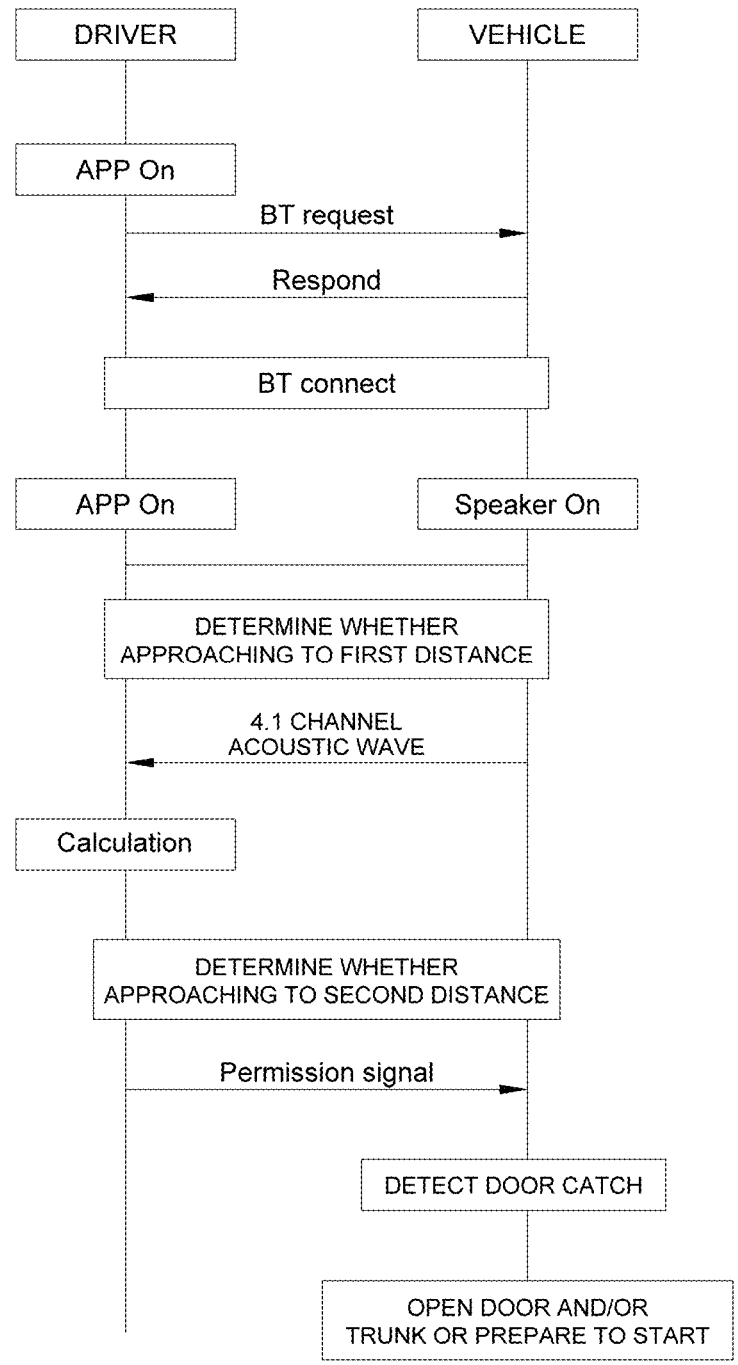
FIG. 6 is a diagram illustrating a flow of transmitting and receiving Bluetooth signals or acoustic wave signals between a vehicle and a mobile device of a driver according to the present invention.

FIG. 5 illustrates a configuration of a system for determining a three-dimensional (3D) location of a driver (or a 3D location of a mobile device of the driver) using received signal strength (RSS) values of Bluetooth signals transmitted from the vehicle and time of arrival (ToA) values of acoustic wave signals (having a frequency of 2 to 24,000 Hz) transmitted from speakers mounted in the vehicle according to the present invention. Hereinafter, although described below as using the Bluetooth signals, it is revealed in advance that radio signals available on smartphones, such as Wi-Fi signals, may also be used. Hereinafter, the vehicle refers to a vehicle with a smart key system, and the smart key system refers to a system including at least three speakers, at least one Bluetooth or Wi-Fi module, and a controller that controls the speakers and Bluetooth and/or Wi-Fi signals and controls signals related to a door or trunk of the vehicle and starting of the vehicle, and the smart key system is a smart control device of the vehicle that defends against an RSA using the mobile device.

According to the present invention, in order to defend against the RSA, a distance between the mobile device of the driver and the vehicle is measured using acoustic waves and the distance is verified to open or close the door of the vehicle. By using the acoustic waves, a location of the mobile device of the driver may be more accurately measured than by using Bluetooth or Wi-Fi signals. Because the Bluetooth or Wi-Fi signals use a high frequency of several GHz, while the acoustic wave signals use a frequency of several KHz, which is a level of about 1/1,000,000 of the Bluetooth or Wi-Fi, the distance may be measured more accurately.

According to the present invention, the distance between the mobile device of the driver and the vehicle is measured using difference in time of arrival (ToA) for the acoustic wave signals generated from at least three speakers reach the mobile device.

The speakers are located inside or outside the vehicle and transmit the acoustic wave signals toward the mobile device of the driver.

The Bluetooth signal may not only be used to transmit security information and commands but may also be used to share an absolute time value between the vehicle and the mobile device.

For example, the Bluetooth signal may include an automobile identification number, a current time, and an identification number of a randomly generated acoustic wave signal. The acoustic wave signal is transmitted for distance measurement and may include an identification number encoded therein. The acoustic wave signal may be transmitted at a frequency in a band that is difficult for humans to hear.

A first specific code of the Bluetooth signal may be transmitted from the vehicle to the mobile device of the driver. The first specific code may be a reference for causing the frequency of the acoustic wave emitted from each of the plurality of speakers to vary within a predetermined range.

First, in a mobile device 600 of a driver, a smart key application is executed (S610). Such an application may be executed in the background and may perform a periodic or aperiodic communication action, such as pinging, to establish a Bluetooth connection with a vehicle.

When a distance between the mobile device 600 of the driver and a vehicle 650 is within a predetermined distance (e.g., 25 m), the vehicle 650 receives a Bluetooth connection request transmitted from the mobile device 600 of the driver (S6x) and transmits a response corresponding to the Bluetooth connection request to the mobile device 600 of the driver (S620).

In this case, the mobile device 600 of the driver performs an operation of turning on a microphone (mic) on the smart key application (S620). The vehicle 650 receives acoustic wave signals from at least three speakers installed inside or outside the vehicle 650 (S625). In this case, the acoustic wave signals transmitted from the speakers may be stereo signals such as 4.1 channel signals and may be signals having a frequency in a range of 2 to 24,000 Hz.

For example, three or more speakers mounted in the vehicle may transmit acoustic waves having different frequencies. This is to measure a distance using a frequency division multiplexing method.

As another example, the distance may be measured based on the acoustic waves transmitted from three or more speakers mounted on the vehicle using a code division multiplexing method.

For example, the first specific code is transmitted from the vehicle to the mobile device of the driver, and then the acoustic wave signal transmitted from each of the speakers is changed within a predetermined range on the basis of the first specific code. A code related to the changing, that is, a second specific code corresponding to the first specific code, is transmitted from the mobile device of the driver to the vehicle via Bluetooth or Wi-Fi communication. It is possible to control the vehicle when the second specific code received by the vehicle matches a third specific code generated from the first specific code.

The mobile device 600 of the driver calculates the distance between the mobile device 600 of the driver and the vehicle 650 by performing time-synchronization on Bluetooth signals received via a pre-connected network with acoustic wave signals transmitted from at least three speakers or by receiving acoustic wave signals transmitted from at least four speakers (S630).

When a 3D location of the vehicle is determined by calculating the distance between the mobile device of the driver and the vehicle, the distance may be calculated using a ToA or a time difference of arrival (TDoA).

When the distance calculated by the mobile device 600 of the driver is within a predetermined distance (e.g., 1 m), the mobile device 600 of the driver transmits a control permission signal to the vehicle 650 (S635). Since the vehicle 650 does not determine a location of the mobile device 600 of the driver, there is no need to worry about the signal being amplified by a relay station. Since the mobile device 600 of the driver directly transmits the control permission signal, the location of the mobile device 600 of the driver cannot be forged without hacking the control permission signal, and thus an RSA may be defended using the mobile device 600. The control permission signal is encrypted to prevent hacking and is transmitted.

In order to prevent the control permission signal from being hacked or forged or altered, a door of the vehicle may be set to be opened or closed only when the driver directly inputs (e.g., touches) a catch of the door (S637).

When the vehicle 650 receives the control permission signal, the vehicle 650 unlocks the door or trunk of the vehicle or prepares to start the vehicle (S640). For example, after the door (or the trunk) of the vehicle is opened, when the driver gets in the vehicle 650 and it is determined that the mobile device of the driver is located inside the vehicle at a predetermined area within the vehicle, the starting of the vehicle is controlled. Therefore, the RSA using remote amplification may be prevented.

Figure 7:
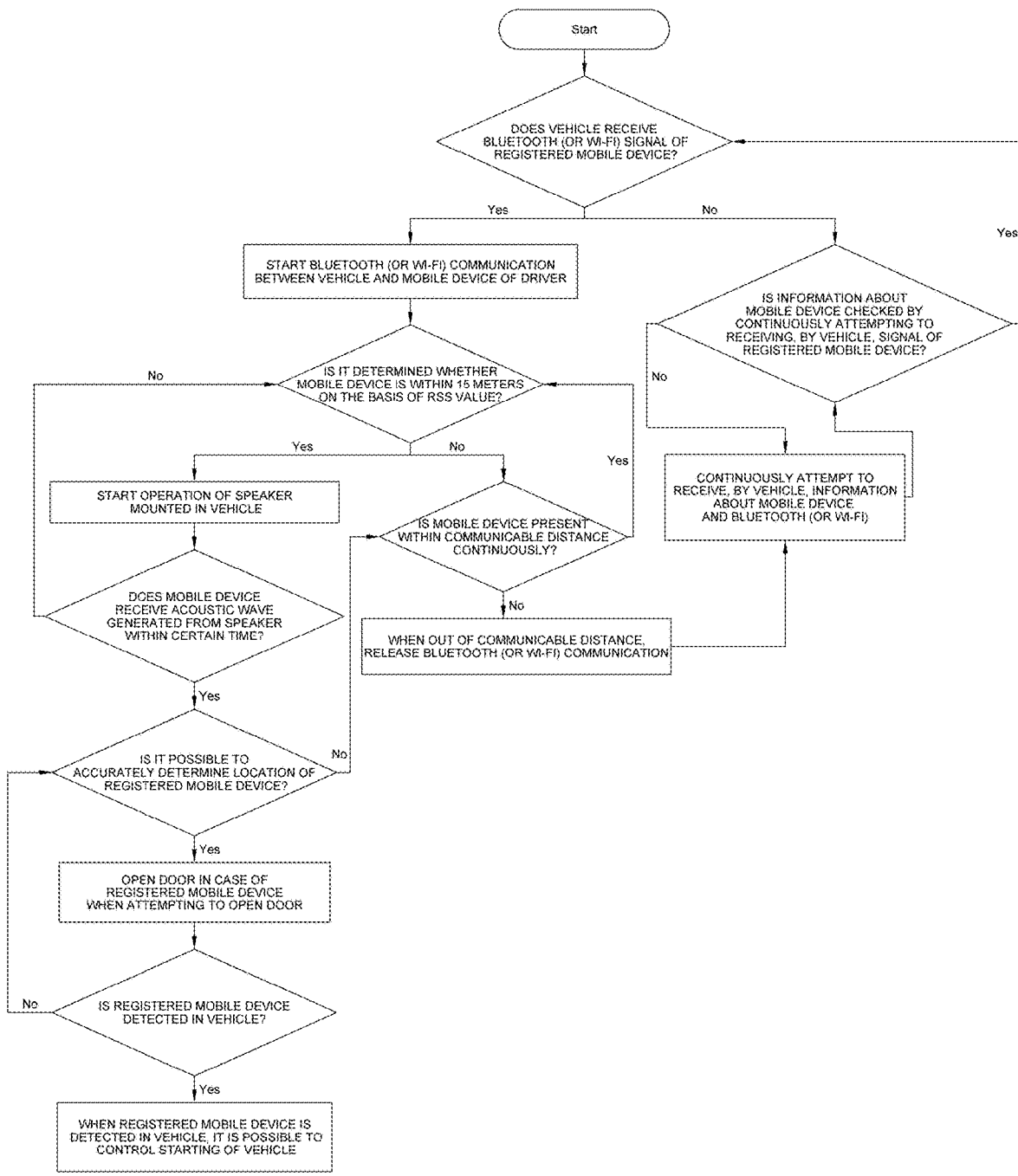
FIG. 7 is a flowchart for describing a technique for recognizing a location of a mobile device inside a vehicle using both of an acoustic wave signal and a Bluetooth signal according to the present invention.

FIG. 7 is a flowchart for describing a technique for recognizing a location of a mobile device inside a vehicle using both of acoustic wave signals and Bluetooth signals according to the present invention.

Referring to FIG. 7, first, the mobile device of the driver is recognized at a remote distance (e.g., 25 m or more) using a Bluetooth or Wi-Fi signal (S710). In this case, a Bluetooth or Wi-Fi module mounted in the vehicle serves as a receiver for receiving the Bluetooth or Wi-Fi signal, and the mobile device of the driver serves as a transmitter for transmitting the Bluetooth or Wi-Fi signal.

By receiving, by the vehicle, the Bluetooth or Wi-Fi signal, a communication network is established between the mobile device of the driver and the vehicle (S720).

When it is determined that the location of the mobile device of the driver is within a first preset range (e.g., 25 m or less of distance from the vehicle) on the basis of an RSS value of the Bluetooth or Wi-Fi signal transmitted via the communication network between the vehicle and the mobile device of the driver, operation of three or more speakers mounted in the vehicle starts (S730). When it is assumed that a minimum distance that the driver should be aware of while the driver runs to open the door of the vehicle is about 20 m, an actual Bluetooth communication distance is preferably set to about 25 m.

In this case, the speakers transmit acoustic waves (having a frequency of 2 to 24,000 Hz) that can be recognized by the mobile device of the driver. Sound waves having inaudible frequencies may be better in order not to cause discomfort to the driver or people around the vehicle.

The vehicle determines a detailed 3D location (e.g., a distance resolution of 10 cm or less) of the mobile device of the driver using a ToA method (S740).

When it is determined that the vehicle and the mobile device of the driver approach within a second preset range (e.g., about 2 m) on the basis of the detailed 3D location determined above, the vehicle prepares to receive a command for opening or closing the door of or the trunk of the vehicle using the Bluetooth or Wi-Fi signal (S750). By using the above command, the door of the vehicle is opened, the trunk is opened, or the vehicle starts. In this case, when a door open button attached to the catch of the door is pressed or when the door is opened only by grabbing the catch of the door, the driver may open or close the door of the vehicle, and when a trunk open or close switch is pressed, the driver may open or close the trunk.

After the door (or the trunk) of the vehicle is opened, when the driver gets in the vehicle and it is determined that the mobile device of the driver is located inside the vehicle in a predetermined area in the vehicle, starting of the vehicle is controlled (S760). Therefore, the RSA using remote amplification may be prevented.

According to the present invention, outside the vehicle, an approximate location of the vehicle is calculated using an RSS method by detecting the Bluetooth or Wi-Fi signal generated in the vehicle, and an accurate location of the vehicle is calculated using a ToA method on the basis of three or more acoustic waves transmitted from the mobile device of the driver and the vehicle.

After a Bluetooth or Wi-Fi communication network is established between the vehicle and the mobile device of the driver, the vehicle and the mobile device of the driver synchronize time information with each other.

The mobile device described above may be implemented with hardware components, software components, or a combination of hardware components and software components. For example, the device and components described in the embodiments may be implemented using one or more general purpose computers or special purpose computers, such as processors, controllers, arithmetic logic units (ALUs), digital signal processors, microcomputers, field programmable arrays (FPAs), programmable logic units (PLUs), microprocessors, micro control units (MCUs), or any other devices capable of executing and responding to instructions. Processing devices may execute an operating system (OS) and execute one or more software applications on the OS. The processing devices may also access, store, manipulate, process, and generate data in response to the execution of the software applications. It can be seen by those skilled in the art that for the ease of understanding, the processing device is described as one being used, but the processing devices may include a plurality of processing elements or a plurality of types of processing elements. For example, the processing devices may include a plurality of processors or one processor and one controller. The software may include computer programs, codes, instructions, or a combination of one or more of the above and may configure the processing device to operate as desired or may command the processing device independently or collectively. The software or the data may be permanently or temporarily embodied in any type of machine, components, physical devices, virtual equipment, computer storage media, or devices, or transmitted signal wave in order to be interpreted by the processing device or to provide instructions or data to the processing device. The software may be distributed over computer systems connected via a network and thus may be stored or executed in a distributed manner. The software and the data may be stored in one or more computer readable recording media. The method according to the embodiment may be embodied in the form of program instructions that can be executed by various computer devices and recorded in a computer readable recording medium. The computer readable recording medium may include a program instruction, a data file, and a data structure, and/or combinations thereof. The program instruction recorded in the recording media may be specially designed and prepared for the embodiments or may be an available well-known instruction for those skilled in the field of computer software. Examples of the computer readable recording medium include magnetic media such as a hard disk, a floppy disk, and a magnetic tape, optical media such as a compact disk read only memory (CD-ROM) and a digital video disk (DVD), magneto-optical media such as a floptical disk, and a hard device such as a read only memory (ROM), a random access memory (RAM), or a flash memory specially made to store and perform the program instruction. Examples of the program instruction may include a machine code generated by a compiler and a high-level language code that can be executed in a computer using an interpreter. Such a hardware device may be configured as at least one software module in order to perform operations of the invention and vice versa.

The exemplary embodiments of the present invention described above are disclosed for purposes of illustration, and it will be understood by those skilled in the art that various modifications, changes, and additions are made within the spirit and scope of the present invention, and such modifications, changes, and additions should be regarded as falling within the scope of the claims.

Various replacements, modifications, and changes may be made without departing from the spirit and scope of the present invention by those skilled in the art. Therefore, the present invention is not limited by the above-described embodiment and the accompanying drawings.

In the example system described above, the methods are described based on a flowchart as a series of steps or blocks. However, the present invention is not limited to the order of steps, and some steps may occur in a different order or at the same time from the other steps as described above. In addition, it will be understood by those skilled in the art that the steps illustrated in the flowchart are not exclusive and other steps may be included or one or more steps in the flowchart may be deleted without affecting the scope of the present invention.

INDUSTRIAL APPLICABILITY

According to the present invention, by replacing a method of transmitting a radio signal of a low frequency (LF) of an existing smart key of a vehicle with a method of transmitting an acoustic wave signal, the same function can be implemented using only a mobile device without the existing smart key of the vehicle and an RSA can be defended.

According to the present invention, a smart key function that is secure against an RSA can be implemented, and by applying the above smart key function, a temporary key that can be temporarily used can be delegated to another user who performs valet parking so that the vehicle can be temporarily controlled.

According to the present invention, the temporary key that can be temporarily used can be delegated to be used only for opening a trunk so that when an authorized delivery man approaches the vehicle, only the trunk can be opened to place objects in the trunk.

According to the present invention, it is possible to apply to car sharing so that a plurality of authenticated users (e.g., a specific group driving a family vehicle or a corporate vehicle) share access rights to the vehicle and share the vehicle.

According to the present invention, by applying the same function to a door lock system, it is possible to implement a function of opening the door lock without additional input when a user with an authenticated mobile device approaches within a certain distance.

The invention claimed is:

1. A method for smart control of a vehicle while defending against a relay station attack (RSA) by using a mobile device, the method comprising:
    establishing a communication network to transmit and receive information with a mobile device of a driver via Bluetooth or Wi-Fi communication;
    when a received signal strength (RSS) value of a Bluetooth or Wi-Fi signal received from the mobile device of the driver is measured to be a predetermined reference value or more, determining that a location of the mobile device of the driver is within a first predetermined range and transmitting recognizable acoustic waves having a frequency of 2 to 24,000 Hz through three or more speakers mounted in the vehicle;
    calculating a time of arrival of the acoustic waves transmitted from the speakers to the mobile device of the driver and determining a three-dimensional (3D) location of the mobile device of the driver;
    when the 3D location of the mobile device of the driver approaches within a second predetermined range, receiving a command including an opening or closing command of a door or trunk from the mobile device of the driver; and
    after performing the command including the opening or closing command of the door or trunk, when it is determined that the mobile device of the driver is located in a predetermined zone in the vehicle, controlling starting of the vehicle,
    wherein the three or more speakers mounted in the vehicle transmit the acoustic waves having different frequencies,
    a frequency of the acoustic wave transmitted from each of the speakers is changed within a predetermined range according to a first specific code received via the Bluetooth or Wi-Fi communication;
    a second specific code corresponding to the first specific code is received via the Bluetooth or Wi-Fi communication; and
    when the second specific code matches a third specific code generated from the first specific code, a code division multiplexing method is used to control the vehicle.

2. The method of claim 1, wherein, in the determining of the 3D location of the mobile device of the driver, the 3D location of the mobile device of the driver is calculated using a time difference of arrival (TDoA).

3. The method of claim 1, wherein the first predetermined range is 25 m.

4. The method of claim 1, wherein the second predetermined range is 1 m.

5. The method of claim 1, wherein the door or trunk of the vehicle is set to be opened or closed when a catch of the door of the vehicle receives an input.

* * * * *